(12) United States Patent  
Xiao

(10) Patent No.: US 9,923,189 B2  
(45) Date of Patent: Mar. 20, 2018

(54) ELECTROPHORETIC DEPOSITION OF AN ELECTRODE FOR A LITHIUM-BASED BATTERY

(71) Applicant: GM GLOBAL TECHNOLOGY OPERATIONS LLC, Detroit, MI (US)

(72) Inventor: Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 15/013,769

(22) Filed: Feb. 2, 2016

(65) Prior Publication Data

US 2017/0222210 A1    Aug. 3, 2017

(51) Int. Cl.
| | |
|---|---|
| *C25D 13/12* | (2006.01) |
| *H01M 4/04* | (2006.01) |
| *H01M 4/38* | (2006.01) |
| *H01M 4/134* | (2010.01) |
| *H01M 4/133* | (2010.01) |
| *H01M 4/62* | (2006.01) |
| *H01M 4/583* | (2010.01) |
| *H01M 4/13* | (2010.01) |
| *H01M 4/139* | (2010.01) |

(52) U.S. Cl.
CPC .......... *H01M 4/0457* (2013.01); *C25D 13/12* (2013.01); *H01M 4/13* (2013.01); *H01M 4/133* (2013.01); *H01M 4/134* (2013.01); *H01M 4/139* (2013.01); *H01M 4/386* (2013.01); *H01M 4/583* (2013.01); *H01M 4/622* (2013.01); *H01M 4/623* (2013.01); *H01M 4/625* (2013.01)

(58) Field of Classification Search  
None  
See application file for complete search history.

(56) References Cited

U.S. PATENT DOCUMENTS

| | | |
|---|---|---|
| 7,736,805 B2 | 6/2010 | Nazri et al. |
| 8,101,152 B1 | 1/2012 | Halalay et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |

(Continued)

FOREIGN PATENT DOCUMENTS

| | | |
|---|---|---|
| CN | 107022784 A | 8/2017 |
| DE | 102017101740 A1 | 8/2017 |
| WO | WO-2015176241 A1 | 11/2015 |

*Primary Examiner* — Kishor Mayekar  
(74) *Attorney, Agent, or Firm* — Harness, Dickey & Pierce, P.L.C.

(57) ABSTRACT

A method for manufacturing an electrode for a lithium-based battery by electrophoretic deposition is provided. The method includes: mixing particles with graphene oxide and a binder in a solution, the particles including a material selected from silicon, silicon oxide, silicon alloys, tin, tin oxide, sulfur, lithium manganese oxide, lithium cobalt oxide, lithium nickel oxide, lithium nickel manganese oxide, and lithium nickel manganese cobalt oxide. The method further includes applying a potential between a current collector and a counter electrode immersed in the solution to deposit a coating of a combination of the particles, at least partially reduced graphene oxide, and binder onto the current collector. The method still further includes drying the coated current collector.

19 Claims, 4 Drawing Sheets

(56) References Cited

U.S. PATENT DOCUMENTS

| | | |
|---|---|---|
| 8,658,295 B2 | 2/2014 | Cheng et al. |
| 9,012,075 B2 | 4/2015 | Verbrugge et al. |
| 9,034,519 B2 | 5/2015 | Xiao et al. |
| 9,379,374 B2 | 6/2016 | Liu et al. |
| 2008/0261116 A1 | 10/2008 | Burton et al. |
| 2009/0325071 A1 | 12/2009 | Verbrugge et al. |
| 2012/0100403 A1 | 4/2012 | Wang et al. |
| 2012/0219852 A1 | 8/2012 | Huang et al. |
| 2012/0229096 A1 | 9/2012 | Nazri |
| 2012/0301790 A1 | 11/2012 | Xiao et al. |
| 2012/0308853 A1 | 12/2012 | Vanimisetti et al. |
| 2012/0328927 A1 | 12/2012 | Timmons et al. |
| 2013/0059195 A1* | 3/2013 | Kuriki .................. H01M 4/134 429/163 |
| 2013/0071736 A1 | 3/2013 | Xiao et al. |
| 2013/0099159 A1 | 4/2013 | Halalay et al. |
| 2013/0156942 A1* | 6/2013 | Yamakaji ............ H01M 4/0404 427/126.6 |
| 2013/0157125 A1 | 6/2013 | Sachdev et al. |
| 2013/0177804 A1 | 7/2013 | Verbrugge et al. |
| 2013/0273428 A1* | 10/2013 | Kawakami ............ H01M 4/131 429/223 |
| 2013/0323595 A1 | 12/2013 | Sohn et al. |
| 2014/0272578 A1 | 9/2014 | Xiao et al. |
| 2014/0295068 A1* | 10/2014 | Nanba ................. H01M 4/0404 427/122 |
| 2015/0166348 A1* | 6/2015 | Ikenuma ............. C01B 31/0438 429/231.95 |
| 2016/0218387 A1* | 7/2016 | Tajima .............. H01M 10/0431 |
| 2017/0047588 A1* | 2/2017 | Mukherjee ............ H01M 4/587 |

* cited by examiner

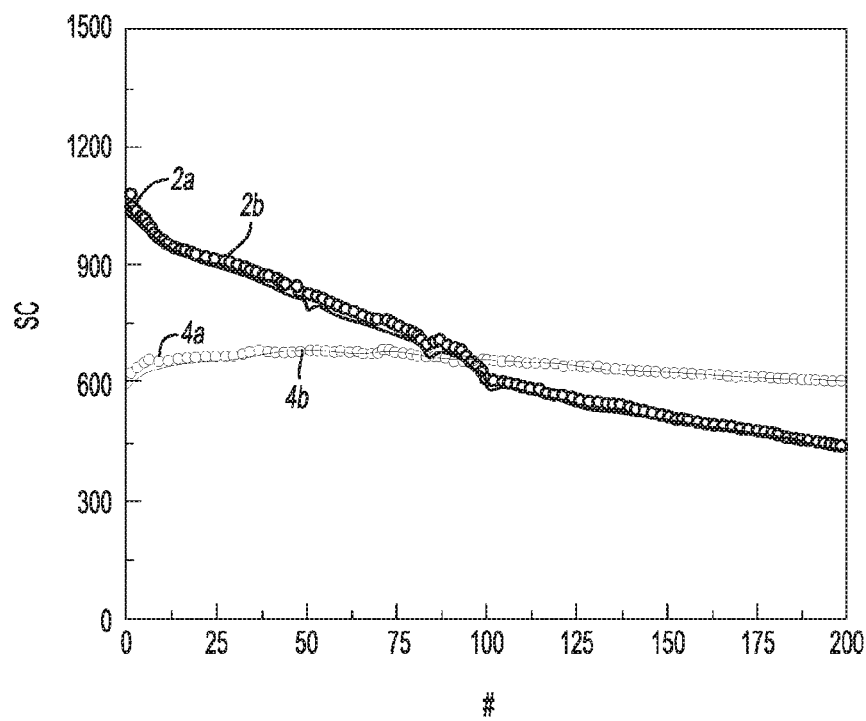
*Fig-1*
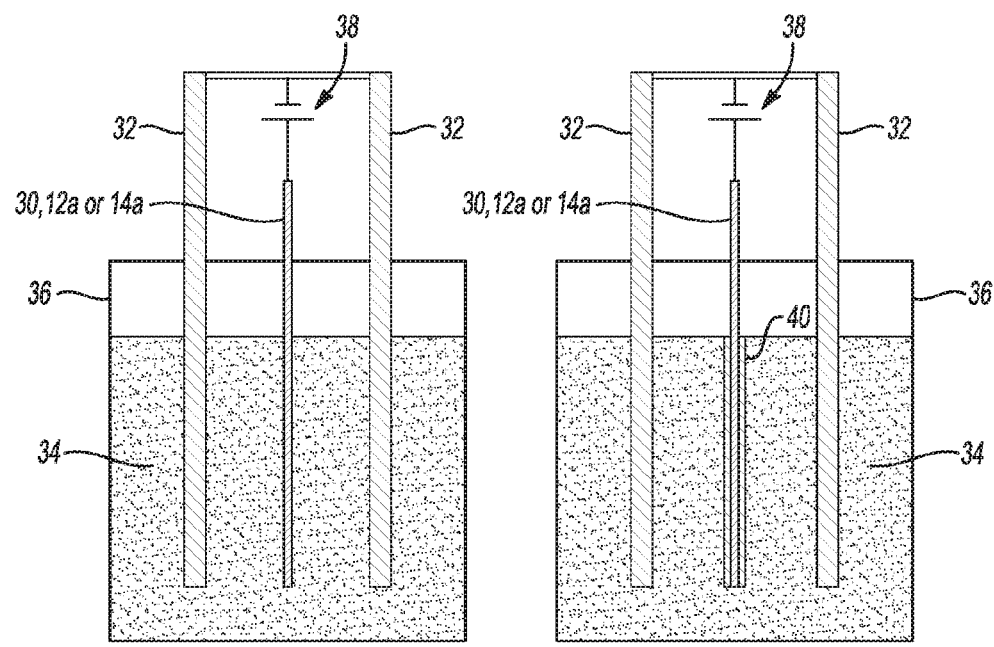
*Fig-3A*  *Fig-3B*

ELECTROPHORETIC DEPOSITION OF AN ELECTRODE FOR A LITHIUM-BASED BATTERY

TECHNICAL FIELD

The present disclosure relates generally to lithium-based batteries and, more particularly, to electrophoretic deposition of an electrode.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons, including a relatively high energy density, a general non-appearance of any memory effect when compared to other kinds of rechargeable batteries, a relatively low internal resistance, a low self-discharge rate when not in use, and an ability to be formed into a wide variety of shapes (e.g., prismatic) and sizes so as to efficiently fill available space in electric vehicles, cellular phones, and other electronic devices. In addition, the ability of lithium ion batteries to undergo repeated power cycling over their useful lifetimes makes them an attractive and dependable power source.

SUMMARY

A method for manufacturing an electrode for a lithium-based battery by electrophoretic deposition is provided. The method includes: mixing particles with graphene oxide and a binder in a solution. The particles may include a material selected from silicon, silicon oxide, silicon alloys, tin, tin oxide, sulfur, lithium manganese oxide, lithium cobalt oxide, lithium nickel oxide, lithium nickel manganese oxide, and lithium nickel manganese cobalt oxide. The method further includes applying a potential between a current collector and a counter electrode immersed in the solution to deposit a coating of a combination of the particles, at least partially reduced graphene oxide, and binder onto the current collector. The method still further includes drying the coated current collector.

BRIEF DESCRIPTION OF THE DRAWINGS

Features of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

FIG. 1, on coordinates of specific capacity SC (in mAh $g^{-1}$) and cycle number (#), is a plot of discharge/charge cycles for a mixture of silicon and graphene in a 1:1 ratio and in a 1:2 ratio;

FIG. 3A is a schematic view of an example method for manufacturing a ribbon or sheet of a current collector coated with the active material/at least partially reduced graphene oxide nanocomposite material, in which the aspects of the components utilized to coat the ribbon or sheet are set up but not initiated;

FIG. 3B is a view similar to that of FIG. 3A, but after initiating the method and depicting the formation of the coating on the ribbon or sheet;

DETAILED DESCRIPTION

Figure 2:
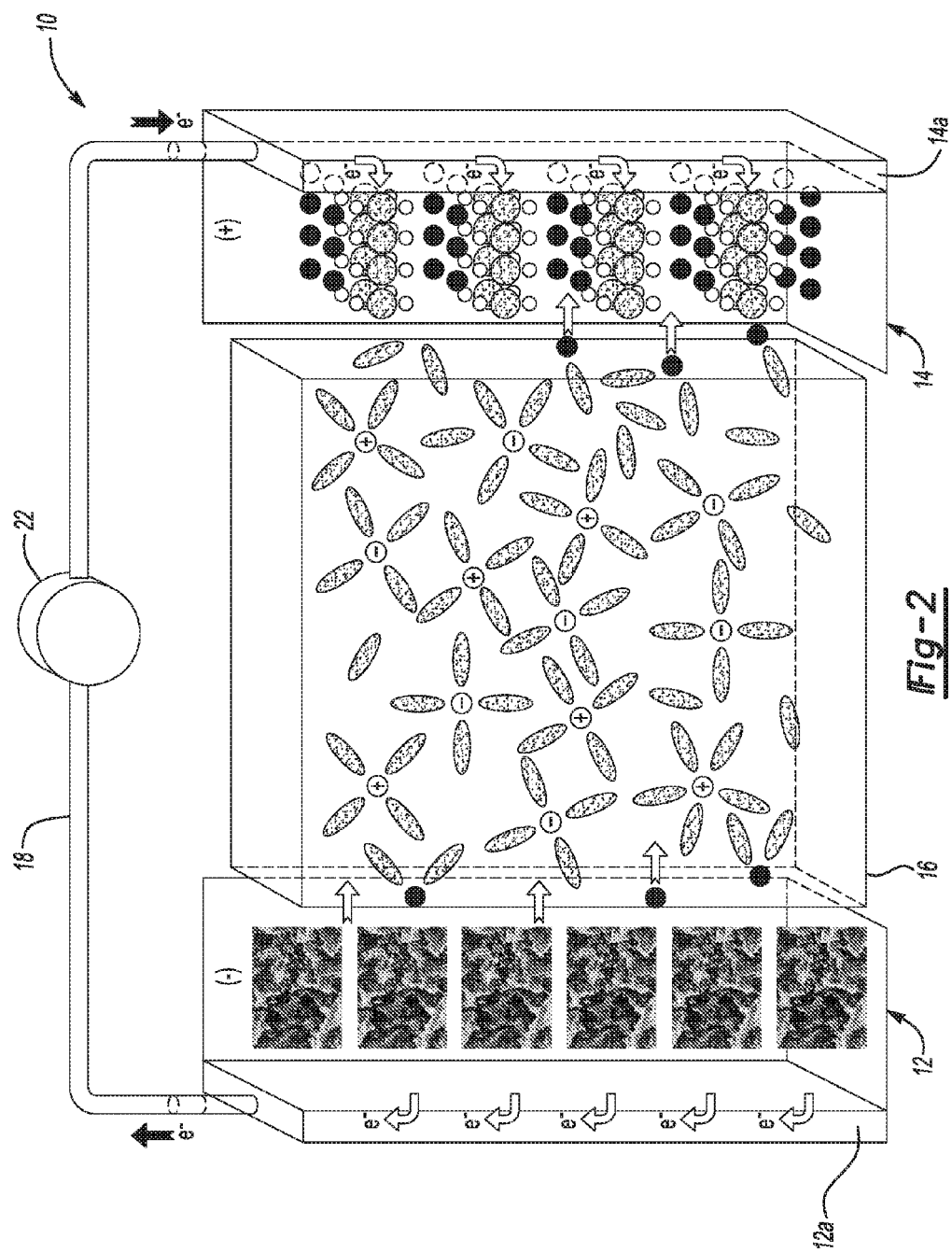
FIG. 2 is a schematic, perspective view of an example of a lithium ion battery during a discharging state, where the negative electrode or anode is an active material/at least partially reduced graphene oxide nanocomposite material that has been electrophoretically deposited on a current collector.

A lithium-based battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium insertion host material, and the positive electrode may include an active material that can store lithium ions at a higher electric potential than the intercalation host material of the negative electrode. Two examples of lithium-based batteries include the lithium or silicon sulfur battery (including a positive electrode with a sulfur-based active material) and the lithium ion battery (including a positive electrode with a lithium-based active material).

Silicon/graphene oxide has shown promising performance as the anode for next generation lithium ion batteries. This combination evidences improved electrode integrity, a stabilized solid electrolyte interphase (SEI layer), and enhanced cycle life. FIG. 1, which is a plot of specific capacity (SC) (in mAh $g^{-1}$) and cycle number (#), depicts the discharge/charge cycles for two silicon:graphene oxide ratios, 1:1 and 1:2. In particular, Curve 2a (darker open circles) shows the discharge values and Curve 2b (darker line) shows the charge values for the 1:1 ratio, while Curve 4a (lighter open circles) shows the discharge values and Curve 4b (lighter line) shows the charge values for the 1:2 ratio.

The discharge/charge values are not quite identical at the beginning of the cycle in each case, but become essentially the same as the number of cycles increases. That is to say, Curve 2a is slightly above Curve 2b for the first 150 cycles or so. Likewise, Curve 4a is slightly above Curve 4b for the first 75 cycles or so. The discharge/charge curve is seen to be nearly constant for the 1:1 ratio, and less so for the 1:2 ratio. These results indicate that silicon/graphene oxide is a stable and efficient anode/negative electrode active material. These results also shown that for the 1:1 ratio, since the Si content is higher, more severe mechanical degradation may occur and the cycle stability may not be as good as for the 1:2 ratio, with lower Si content. Moreover, current methods for making silicon/graphene oxide use freeze drying, which is needed to maintain 3D structuring and achieve a wrapping effect (wrapping of the silicon particle by graphene oxide), and a post-heat treatment, which is needed to reduce graphene oxide. However, freeze drying is a high cost process and can be difficult to scale up.

In the examples disclosed herein, a method is disclosed which forms an active material/at least partially reduced graphene oxide nanocomposite material directly on a current collector. The method involves in-situ reduction of at least some of the graphene oxide to graphene, and the at least partially reduced graphene oxide can readily wrap around the active material. Wrapping the active material in reduced graphene oxide can reduce the energy of the graphene, improve the cycle stability of the lithium-based battery, and can improve the life cycle of the active material. The at least partially reduced graphene oxide acts as a protective structure that contains the active material. As such, even if the active material breaks as a result of expansion and contraction during cycling, it can continue to function as an active material, in part, because it is confined. Furthermore, the method eliminates the need for freeze drying and post-heat treatment, and thus is an efficient process.

As mentioned above, the method disclosed herein forms an active material/at least partially reduced graphene oxide nanocomposite material. The active material may be a negative electrode active material, such as silicon, silicon oxide ($SiO_x$, where $0<x\leq2$), silicon alloys, tin, or tin oxide ($SnO_y$, where $0<y\leq2$). The active material may be a positive electrode active material, such as sulfur, lithium manganese oxide, lithium cobalt oxide, lithium nickel oxide, lithium nickel manganese oxide, and lithium nickel manganese cobalt oxide. Each of the negative electrode active materials disclosed herein may be used to form a negative electrode or anode for a lithium ion battery, and the silicon-based negative electrode active materials may be used to form a negative electrode or anode for a silicon sulfur battery. The sulfur-based positive electrode active materials disclosed herein may be used to form a positive electrode for the lithium or silicon sulfur battery, and the other positive electrode active materials disclosed herein may be used to form a positive electrode or cathode for a lithium ion battery.

Referring now to FIG. 2, an example of a lithium ion battery 10 is illustrated. The lithium ion battery 10 generally includes a negative electrode 12, a negative-side current collector 12a, a positive electrode 14, a positive-side current collector 14a, and a microporous polymer separator 16 disposed between the negative electrode 12 and the positive electrode 14. An interruptible external circuit 18 connects the negative electrode 12 and the positive electrode 14. Each of the negative electrode 12, the positive electrode 14, and the microporous polymer separator 16 are soaked in an electrolyte solution capable of conducting lithium ions.

The negative-side current collector 12a and the positive-side current collector 14a may be positioned in contact with the negative electrode 12 and the positive electrode 14, respectively, to collect and move free electrons to and from the external circuit 18. As mentioned above, the negative electrode 12 may be formed directly on the negative-side current collector 12a and the positive electrode 14 may be formed directly on the positive-side current collector 14 using the method disclosed herein. Examples of the current collectors 12a and 14a are described below.

The lithium ion battery 10 may support a load device 22 that can be operatively connected to the external circuit 18. The load device 22 may be powered fully or partially by the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be a power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 can include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10 may also be connected in series and/or in parallel with other similar lithium ion batteries to produce a greater voltage output and current (if arranged in parallel) or voltage (if arranged in series) if the load device 22 so requires.

The lithium ion battery 10 can generate a useful electric current during battery discharge by way of reversible electrochemical reactions that occur when the external circuit 18 is closed to connect the negative electrode 12 and the positive electrode 14 at a time when the negative electrode 12 contains a sufficiently higher relative quantity of intercalated lithium. The chemical potential difference between the positive electrode 14 and the negative electrode 12 (ranging from approximately 2.0 volts to 5.0 volts, depending on the exact chemical make-up of the electrodes 12, 14) drives electrons produced by the oxidation of intercalated lithium at the negative electrode 12 through the external circuit 18 towards the positive electrode 14. Lithium ions, which are also produced at the negative electrode 12, are concurrently carried by the electrolyte solution through the microporous polymer separator 16 and towards the positive electrode 14. The electrons flowing through the external circuit 18 and the lithium ions migrating across the microporous polymer separator 16 in the electrolyte solution eventually reconcile and form intercalated lithium at the positive electrode 14. The electric current passing through the external circuit 18 can be harnessed and directed through the load device 22 until the level of intercalated lithium in the negative electrode 12 falls below a workable level or the need for electrical energy ceases.

The lithium ion battery 10 can be charged or re-powered at any time after a partial or full discharge of its available capacity by applying an external battery charger to the lithium ion battery 10 to reverse the electrochemical reactions that occur during battery discharge. The connection of an external battery charger to the lithium ion battery 10 compels the otherwise non-spontaneous oxidation of lithium transition metal oxide or phosphate at the positive electrode 14 to produce electrons and release lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle.

The external battery charger that may be used to charge the lithium ion battery 10 may vary depending on the size, construction, and particular end-use of the lithium ion battery 10. Examples of some suitable external battery chargers include a battery charger plugged into an AC wall outlet and a motor vehicle alternator.

The lithium ion battery 10 generally operates by reversibly passing lithium ions between the negative electrode 12 and the positive electrode 14. In the fully charged state, the voltage of the battery 10 is at a maximum (typically in the range 2.0V to 5.0V); while in the fully discharged state, the voltage of the battery 10 is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery 10 contains a high concentration of intercalated lithium while the positive electrode 14 is relatively depleted. When the negative electrode 12 contains a sufficiently higher relative quantity of intercalated lithium, the lithium ion battery 10 can generate a beneficial electric current by way of the previously described reversible electrochemical reactions that occur when the external circuit 18 is closed to connect the negative electrode 12 and the positive electrode 14. The establishment of the closed external circuit under such circumstances causes the extraction of intercalated lithium from the negative electrode 12. The extracted lithium atoms are split into lithium ions (identified by the closed circles and by the open circles having a (+) charge) and electrons (e$^-$) as they leave an intercalation host at the negative electrode-electrolyte interface.

The negative electrode 12 may include an example of the active material/at least partially reduced graphene oxide nanocomposite material disclosed herein. The active material may be any lithium host active material that can sufficiently undergo lithium insertion and deinsertion while a suitable current collector 12a is functioning as the negative terminal of the lithium ion battery 10. Examples of the active material for the negative electrode 12 include silicon, silicon oxide ($SiO_x$, where $0<x\leq2$), silicon alloys (Si—Sn), tin, or tin oxide ($SnO_y$, where $0<y\leq2$).

The negative electrode 12 may also include a polymer binder material to structurally hold the active material/at least partially reduced graphene oxide nanocomposite material together. As will be described below, the binder may be incorporated into the negative electrode 12 during examples of the method disclosed herein. Also as will be described below, the binder that is included may depend, in part, upon the solvent used in the method(s). Examples of suitable binders include polyvinylidene fluoride (PVdF), an ethylene propylene diene monomer (EPDM) rubber, polyethylene oxide (PEO), polyacrylic acid (PAA), cross-linked polyacrylic acid-polyethylenimine, polytetrafluoroethylene (PTFE), polyimide, sodium alginate, polyvinyl alcohol (PVA), styrene-butadiene rubber (SBR), fluorine acrylic hybrid latex, and/or carboxymethyl cellulose (CMC).

The positive electrode 14 may be formed from an example of the active material/at least partially reduced graphene oxide nanocomposite material disclosed herein. The active material may be any material that can sufficiently undergo lithium insertion and deinsertion while a suitable current collector 14a is functioning as the positive battery terminal. For the lithium ion battery 10, the active material may be lithium manganese oxide, lithium cobalt oxide, lithium nickel oxide, lithium nickel manganese oxide, or lithium nickel manganese cobalt oxide. When the positive electrode 14 is to be used in a lithium or silicon sulfur battery, the active material may be a sulfur carbon composite including a ratio of sulfur:carbon ranging from 1:9 to 9:1.

The positive electrode 14 may also include a polymer binder material to structurally hold the active material/at least partially reduced graphene oxide nanocomposite material together. As will be described below, the binder may be incorporated into the positive electrode 14 during examples of the method disclosed herein. Also as will be described below, the binder that is included may depend, in part, upon the solvent used in the method(s). Examples of suitable binders for the positive electrode 14 include those listed for the negative electrode 12.

The microporous polymer separator 16 (which may also be referred to herein as simply the separator 16 or the polymer separator 16), which operates as both an electrical insulator and a mechanical support, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions (identified by the closed circles and by the open circles having a (+) charge in FIG. 1) and related anions (identified by the open circles having a (−) charge in FIG. 2) through an electrolyte solution filling its pores.

The microporous polymer separator 16 includes, or in some examples is, a membrane, and this membrane may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available polyolefin microporous polymer separators 16 include CELGARD® 2500 (a monolayer polypropylene separator) and CELGARD® 2320 (a trilayer polypropylene/polyethylene/polypropylene separator) available from Celgard LLC. Some other commercially available separators are available from Entek International, Asahi-Kasei Corporation, Toray Industries, and SK Energy.

In another example, the membrane of the microporous polymer separator 16 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 16 is poly(p-hydroxybenzoic acid). In yet another example, the membrane may be a combination of one of these polymers and a polyolefin (such as PE and/or PP).

In yet another example, the membrane of the microporous separator 16 may be chosen from a combination of the polyolefin (such as PE and/or PP) and one or more of the polymers for the separator 16 listed above.

The microporous polymer separator 16 may contain a single layer or a multi-layer laminate fabricated from either a dry or wet process, by solvent casting, by a non-woven fiber laying process, or by any other process for making a microporous polymer membrane with properties suitable for application in Li-based batteries. For example, in one example, a single layer of the polyolefin may constitute the entirety of the microporous polymer separator 16 membrane. In another example, a single layer of one or a combination of any of the polymers from which the microporous polymer separator 16 may be formed (e.g., the polyolefin and/or one or more of the other polymers listed above for the separator 16) may constitute the entirety of the separator 16. As another example, however, multiple discrete layers of similar or dissimilar polyolefins and/or polymers for the separator 16 may be assembled into the microporous polymer separator 16. In one example, a discrete layer of one or more of the polymers may be coated on a discrete layer of the polyolefin for the separator 16. Further, the polyolefin (and/or other polymer) layer, and any other optional polymer layers, may further be included in the microporous polymer separator 16 as a fibrous layer to help provide the microporous polymer separator 16 with appropriate structural and porosity characteristics. A more complete discussion of single and multi-layer lithium-based battery separators, and the dry and wet processes that may be used to make them, can be found in P. Arora and Z. Zhang, "Battery Separators," *Chem. Rev.*, 104, 4424-4427 (2004).

Still other suitable polymer separators 16 include those that have a ceramic layer attached thereto, and those that have ceramic filler in the polymer matrix (i.e., an organic-inorganic composite matrix).

Each of the negative electrode 12, the positive electrode 14, and the porous separator 16 are soaked in the electrolyte solution. It is to be understood that any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Examples of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4$, $LiCF_3SO_3$, $LiN(CF_3SO_2)_2$(LiTFSI), $LiN(FSO_2)_2$(LiFSI), $LiAsF_6$, $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate) (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, thiophene, 3,4-ethylenedioxythiophene, 2,5-dihydrofuran, trishexafluoro-iso-propylphosphate, trihydroxybenzene, tetramethoxytitanium, etc. While some examples have been given herein, it is to be understood that other additives could be used. When included, additives may make up from about 0.05% to about 5% of the composition of the electrolyte solution.

Polymer electrolytes, ionic liquids, and melt electrolytes (a.k.a. deep eutectic electrolytes) can also be used. However, these materials, if used in their neat form, may exhibit certain properties that could present challenges. These properties include low conductivity at sub-ambient temperatures, high viscosity, and poor wetting of electrodes.

When the negative or positive electrode 12, 14 is incorporated into a lithium or silicon sulfur battery (not shown), the electrolyte solution includes an ether based solvent and any of the salt(s) or salt(s) and additive(s) previously mentioned. Examples of the ether based solvent include 1,3-dioxolane (DOL), 1,2-dimethoxyethane (DME), tetrahydrofuran (THF), 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof. One example of a mixture includes 1,3-dioxolane and 1,2-dimethoxyethane.

In accordance with the teachings herein, a method for manufacturing an electrode (e.g., negative electrode 12 or positive electrode 14) for a lithium-based battery by electrophoretic deposition is provided. The method includes mixing particles with graphene oxide and a binder in a solution, the particles being a material selected from silicon, silicon oxide ($SiO_x$, where $0<x\leq2$), silicon alloys, tin, tin oxide ($SnO_y$, where $0<y\leq2$), sulfur, lithium manganese oxide, lithium cobalt oxide, lithium nickel oxide, lithium nickel manganese oxide, and lithium nickel manganese cobalt oxide. The method further includes applying a potential between a current collector and a counter electrode immersed in the solution to deposit a coating of a combination of the particles, at least partially reduced graphene oxide, and binder onto the current collector. The method still further includes drying the coated current collector.

FIG. 3A is a schematic view of an example of the method for manufacturing the electrode (e.g., negative electrode 12 or positive electrode 14, neither of which is shown in FIG. 3A). In an example of the method, a ribbon or sheet 30 of a current collector is coated with an active material/at least partially reduced graphene oxide nanocomposite material. In FIG. 3A, all aspects of the components utilized to coat the ribbon or sheet 30 are set up but not activated. As mentioned above, the ribbon or sheet 30 is a current collector that is to be coated. The ribbon or sheet 30 may be any of the materials described for the current collector 12a or 14a, depending, in part upon whether the coating formed thereon is to function as the negative electrode 12 or the positive electrode 14. During the method, the ribbon or sheet 30 acts as one electrode, and a counter electrode 32 is also included. As depicted, both the ribbon or sheet 30 and the counter electrode 32 are immersed in the solution 34 contained in a container 36.

FIG. 3B is a view similar to that of FIG. 3A, but after the potential is applied. The potential is applied by a voltage source 38 to the ribbon or sheet 30 and the counter electrode 32. As shown in FIG. 3B, the application of the potential forms the coating 40 on the ribbon or sheet 30.

At the outset of the method disclosed herein, any of the active material particles disclosed herein may be mixed with graphene oxide and a suitable binder in a solution. The selection of the particles may depend upon the coating 40 and the electrode 12, 14 that is to be formed, and the selection of the binder may depend upon whether the solution is an aqueous solution or a non-aqueous solution.

The particles added to the solution 34 become the active material in the negative electrode 12 or the positive electrode 14. As such, when the coating 40 is to form a negative electrode 12, the particles mixed into the solution 34 may be silicon, silicon oxide ($SiO_x$, where $0<x\leq2$), silicon alloys, tin, or tin oxide ($SnO_y$, where $0<y\leq2$); and when the coating 40 is to form a positive electrode 14, the particles mixed into the solution 34 may be sulfur, lithium manganese oxide, lithium cobalt oxide, lithium nickel oxide, lithium nickel manganese oxide, or lithium nickel manganese cobalt oxide. The particles may be nanoparticles to micron particles, having a particle size ranging from about 10 nm to about 10 µm.

The solution 34 may include an aqueous-based solvent and the binder, which in this example is soluble in the aqueous-based solvent. For example, the aqueous-based solvent may be water and the binder may be selected from sodium alginate, polyvinyl alcohol (PVA), polyacrylic acid (PAA), carboxymethyl cellulose (CMC), styrene-butadiene rubber (SBR), fluorine acrylic hybrid latex, and mixtures thereof.

In another example, the solution may include a non-aqueous-based solvent and the binder, which in this example is soluble in the non-aqueous-based solvent. The non-aqueous-based solvent may be selected from N-methyl pyrrolidone (NMP) and toluene and the binder may be selected from polyvinylidene fluoride (PVdF), polyethylene oxide (PEO), an ethylene propylene diene monomer (EPDM) rubber, polyacrylic acid (PAA), cross-linked polyacrylic acid-polyethylenimine, polytetrafluoroethylene (PTFE), and polyimide.

The graphene oxide added to the solution 34 may be in the form of 2D nano-sheets with a thickness ranging from about 0.3 nm to about 10 nm. The graphene oxide may have a lateral dimension ranging from about 100 nm to about 50 microns.

Within the solution 34, the particles and graphene oxide are provided in a ratio of 9:1 to 1:9 of particle material: graphene oxide. This ratio may be determined, at least in part, by the particle size of the active material particles. The particle size of the material particles can affect the encapsulation or wrapping of the graphene oxide. Generally, if the material particle size is larger, the ratio of particle material: graphene oxide may be larger. The particles, graphene oxide, and binder may be provided in a ratio of 95:5 (i.e., 19:1) to 60:40 (i.e., 3:2) of particles/graphene oxide:binder.

The current collector 12a, 14a and the counter electrode 32 are immersed in the solution 34, and a potential is applied there between. In the method, the current collector 12a, 14a i) is the surface upon which the coating 40 is to be formed, ii) functions as an active electrode in the electrophoretic deposition, and iii) is the form of the ribbon or sheet 30 (FIGS. 3A and 3B). The material of the current collector 12a, 14a depends upon the particle material in the solution 34.

Where the particle material is silicon, silicon oxide ($SiO_x$), silicon alloys, tin, or tin oxide ($SnO_y$, where $0<y\leq2$) (i.e., a negative electrode active material), the ribbon or sheet 30 (i.e., current collector 12a) acts as a working electrode during the method. When these particular particle materials are used to form the coating 40, the ribbon or sheet 30 becomes the current collector 12a and the coating 40 becomes the negative electrode 12. As such, in these examples of the method, the ribbon or sheet 30 may be a material selected from copper, nickel, titanium, stainless steel, graphene paper, graphite paper, and carbon nanofiber paper (all of which are suitable current collector materials for the negative electrode 12).

Where the particle material is sulfur, lithium manganese oxide, lithium cobalt oxide, lithium nickel oxide, lithium nickel manganese oxide, or lithium nickel manganese cobalt oxide (i.e., a positive electrode active material), the ribbon or sheet 30 (i.e., current collector 14a) acts as the working electrode. When these particular particle materials are used to form the coating 40, the ribbon or sheet 30 becomes the current collector 14a and the coating 40 becomes the positive electrode 14. As such, in these examples, the ribbon or sheet 30 may be a material selected from aluminum and stainless steel (all of which are suitable current collector materials for the positive electrode 14).

The potential may be applied between the ribbon or sheet 30 and the counter electrode 32 to deposit the coating 40 on the portion of the ribbon or sheet 30 that is immersed in the solution 34. The application of the potential initiates the electrophoretic deposition process. The potential may be applied within a range of about 5 volts to about 100 volts for a time of about 10 seconds to about 10 minutes. During the electrophoretic deposition, the particles, which carry a surface charge, and the binder migrate toward the ribbon or sheet 30 driven by the electric field. Also during the electrophoretic deposition, the graphene oxide wraps around the particles and the binder, and also at least partially reduces to form some graphene.

The end result of the electrophoretic deposition is the direct deposition of the active materials onto the ribbon or sheet 30/current collector 12a or 14a in the form of the coating 40. The coating 40 includes both the active material particles and the binder wrapped or encapsulated in at least partially reduced graphene oxide (i.e., the active material/at least partially reduced graphene oxide nanocomposite material). The at least partially reduced graphene oxide in the coating 40 may be graphene or a mixture of graphene and graphene oxide (that does not get reduced during the method). The resulting coating 40 may have a thickness within a range of about 500 nm to about 100 microns.

The coated current collector (i.e., ribbon or sheet 30 having coating 40 thereon) may be dried. In an example in which the coating 40 includes Si or Si alloy particles, drying may occur in a vacuum or an inert or a reducing atmosphere selected from $N_2$, Ar, $H_2$, and Ar/$H_2$ mixture at an elevated temperature for a period of time. It has been determined that for coatings 40 with any of the active material particles disclosed herein, drying the coating 40 in a vacuum, or an inert or a reducing atmosphere may result in further reduction of the graphene oxide to graphene. In many instances, use of a reducing atmosphere may be most effective to reduce graphene oxide to graphene. The reduction of graphene oxide may improve the electric conductivity of the coating 40.

If a vacuum is employed for drying, the vacuum may be within a range of about $10^{-5}$ mTorr to about 10 mTorr. Whether a vacuum is employed or an inert or reducing atmosphere is employed, the elevated temperature may be within a range of about 80° C. to about 300° C. The period of time of heating may be within a range of about 30 minutes to about 10 hours.

As mentioned above, the coating 40 can function as a positive electrode 14 or a negative electrode 12, depending upon the active material particles therein. As such, the current collector 12a with its coating 40 may be used as the negative electrode 12 in the lithium ion battery 10 or a lithium or silicon sulfur battery (not shown). Alternatively, the current collector 14a with its coating 40 may be used as the positive electrode 14 in the battery 10 or in a lithium or silicon sulfur battery (not shown).

Figure 4:
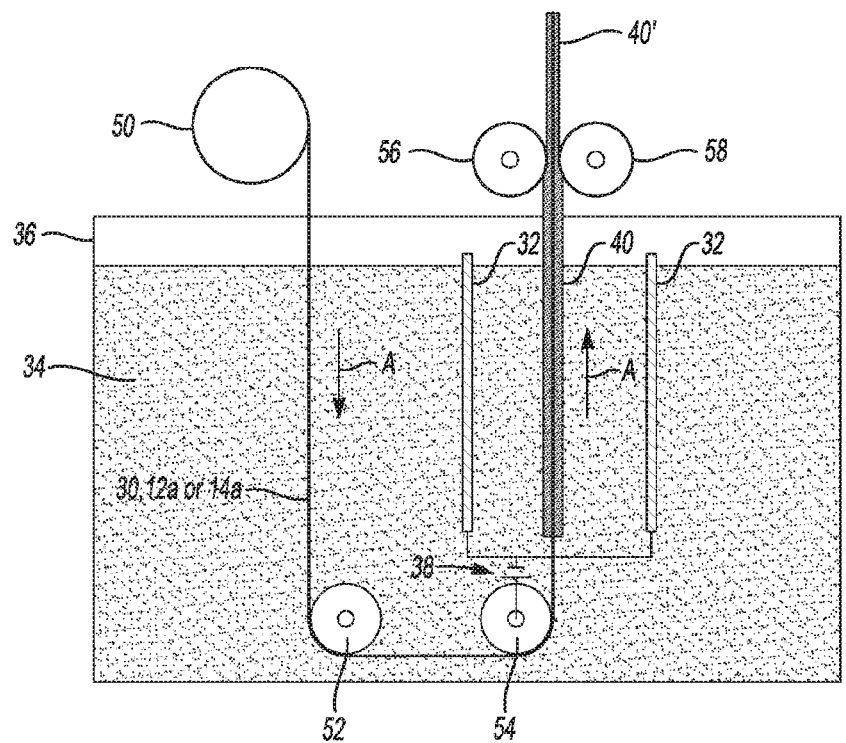
FIG. 4 is a schematic view of an example continuous roll-to-roll method for manufacturing a ribbon or sheet of a current collector coated with the active material/at least partially reduced graphene oxide nanocomposite material.

The coating 40 may be deposited on the current collector 12a, 14a in a continuous roll-to-roll process. FIG. 4 is a schematic view of an example continuous roll-to-roll method for manufacturing a ribbon or sheet 30 (formed of a material suitable for current collector 12a or current collector 14a) coated with the coating 40 of the active material/at least partially reduced graphene oxide nanocomposite material. During the method, the ribbon or sheet 30 may function as the working electrode and the counter-electrode 32 may function as the counter electrode, as shown in FIG. 4 to produce the coating 40/negative electrode 12) on the current collector 12a. However, the same considerations discussed above in connection with FIGS. 3A-3B may be employed in this example as well, making the ribbon or sheet 30 the working electrode during the method to produce the coating 40/positive electrode 14 on the current collector 14a.

The ribbon or sheet 30 may be a continuous ribbon or sheet that is passed from a source roll 50 through the solution 34 using rollers 52, 54, with one of the rollers 54 being grounded with respect to the solution 34 and the counter-electrode 32 being biased negative or positive with respect to the solution 34. Upon application of a suitable potential between the ribbon or sheet 30 and the counter electrode 32, the coating 40 is formed on the continuous sheet/ribbon 30. The coated current collector may be collected on a collecting roll (not shown). The direction of movement of the continuous sheet/ribbon 30 from source roll 50 through the solution 34 and to the collecting roll is indicated by arrows A.

The coated current collector may be passed through pressure rollers 56, 58 that exert a force of about 5 psi to about 20 psi after emerging from the solution 34 and prior to being collected on the collecting roll in order to control porosity of the pressed coating 40'. The porosity of the pressed coating 40' may range from about 15% to about 60%. The drying step discussed above can be performed at the same time as applying pressure or after.

As one specific example, a silicon/at least partially reduced graphene oxide negative electrode 12 may be formed by using electrophoretic deposition to directly deposit a combination of Si/at least partially reduced graphene oxide/binder onto a copper (Cu) current collector. In the method used to form this specific example, silicon nanoparticles may be mixed with graphene oxide and a binder in a solution. A potential may be applied between the current collector and a counter electrode to thereby deposit the silicon particles and the binder in the form of a coating 40, where the silicon particles and the binder are wrapped with at least partially reduced graphene oxide. The completed coating forms a negative electrode on a current collector, both of which may be dried, such as in a vacuum at an elevated temperature, e.g., 120° C.

In this example, the process co-deposits Si and at least partially reduced graphene oxide active materials together on the current collector. During the process, the graphene oxide can be partially reduced, which improves the conductivity of the negative electrode 12. As a result of the method, the at least partially reduced graphene oxide can easily wrap around the Si nanoparticles, which reduces the system energy in graphene. The wrapped Si nanoparticles can have significantly improved cycle stability and life. Meanwhile, the binder can be incorporated into the system, so the mechanical integrity of the electrode can be improved also.

To further illustrate the present disclosure, an example is given herein. It is to be understood that this example is provided for illustrative purposes and is not to be construed as limiting the scope of the present disclosure.

EXAMPLE

Commercially available graphene oxide was used in this example. The Raman spectrum of the as received graphene oxide was measured. The graphene oxide was then subjected to electrophoretic deposition (EPD) according to the example method disclosed herein. Two solutions were prepared with the graphene oxide, silicon particles, sodium alginate and water. For one sample, the solution included a 1:1 ratio of silicon particles to graphene oxide (Si:GO), and for another sample, the solution included a 1:2 ratio of Si:GO. Respective copper current collectors and copper counter electrodes were placed into the solutions. Potential was applied between the respective copper current collectors and copper counter electrodes to electrophoretically deposit coatings of silicon/at least partially reduced graphene oxide nanocomposite material onto the copper current collectors. The coatings were dried in a vacuum at 120° C., and the respective samples were used as described below.

Figure 5A:
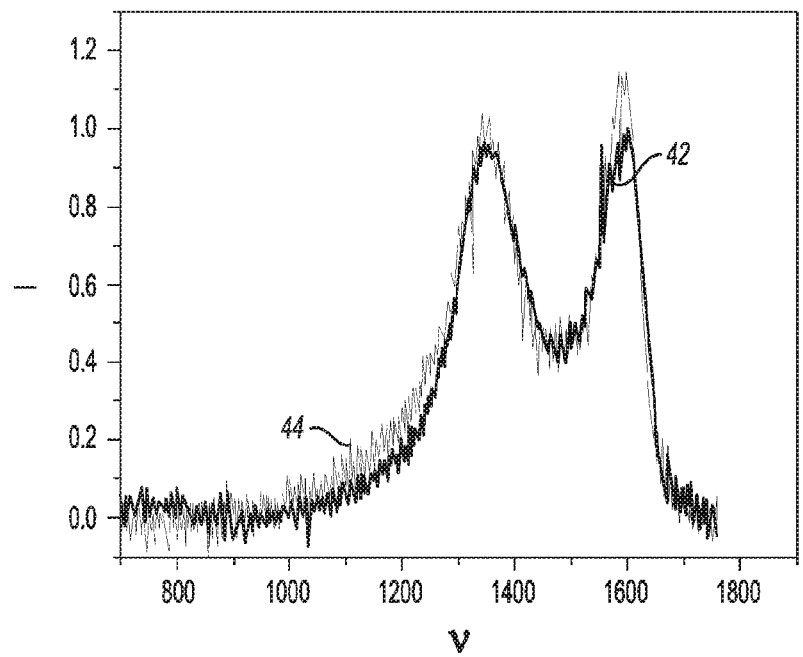
FIG. 5A is a plot, on coordinates of normalized intensity I (in arbitrary units) and wavenumber ν (in $cm^{-1}$), showing a portion of the Raman spectrum of graphene oxide and electrophoretically-deposited graphene oxide.

FIG. 5A, on coordinates of normalized intensity (I) (in arbitrary units) and wavenumber (v) (in $cm^{-1}$), is a plot showing a portion of the Raman spectrum of graphene oxide and one of the electrophoretically-deposited graphene oxide coatings (the sample prepared with 1:2 Si:GO ratio). FIG. 5A compares the G peak intensity (at 1600 cm−1) of the graphene oxide before and after the EPD process. This figure shows that the G peak intensity increased for graphene oxide after the EPD process, indicating that the graphene oxide had partially reduced during the process. Specifically, in FIG. 5A, Curve 42 illustrates the Raman spectrum for graphene oxide before the EDP process. Curve 44 illustrates the Raman spectrum for the 1:2 electrophoretically-deposited graphene oxide sample. As noted above, the stronger peak of Curve 44 at about 1600 cm$^{-1}$ (the "G" peak) indicates more graphitic carbon formed due to the reduction of the graphene oxide.

The dried samples were punched into disks with a diameter around 12 mm. The disks were directly used as the electrodes in respective sample coin cells with lithium metal as the counter electrode and an electrolyte of ethylene carbonate/diethyl carbonate (EC/DEC, 1:1 volume ratio) and 10% fluoroethylene carbonate (FEC). The two sample coin cells were cycled with C/3 rate.

Figure 5B:
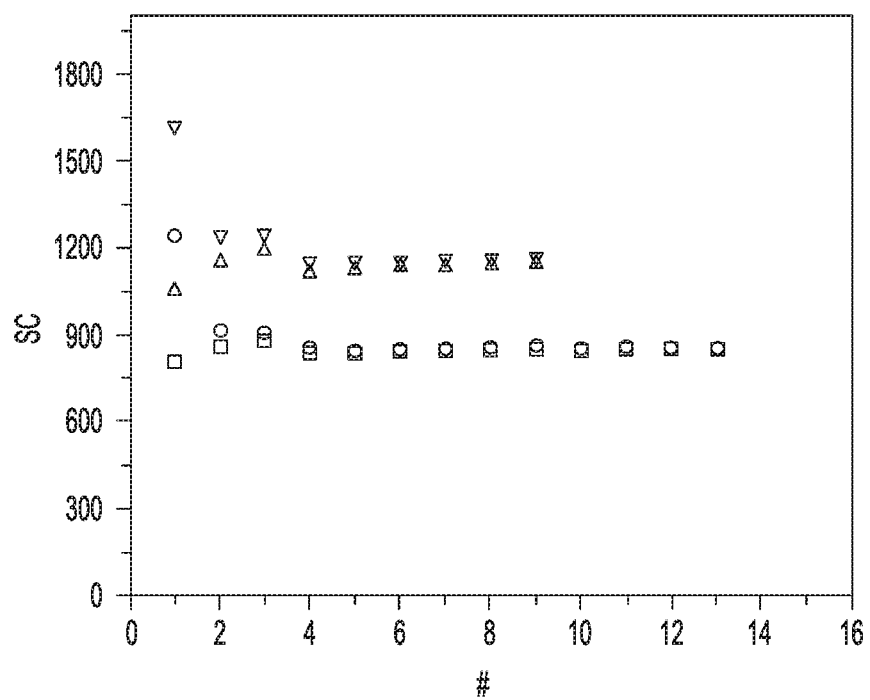
FIG. 5B is a plot, on coordinates of specific capacity SC (in mAh $g^{-1}$) and cycle number (#), of the discharge capacity and charge capacities of electrodes formed from solutions with different ratios of silicon particles to graphene oxide.

FIG. 5B, on coordinates of specific capacity (SC) (in mAh g$^{-1}$) and cycle number (#), is a plot of the discharge and charge capacities for the negative electrodes formed with different ratios of silicon to graphene oxide in solution. The upper data points are for the negative electrode formed with 1:1 silicon:graphene oxide (Si:GO) and the lower data points are for the negative electrode with 1:2 Si:GO. More particularly, the data points denoted Δ indicate the specific capacity during charge for the negative electrode formed with a Si:GO ratio of 1:1. The data points denoted ∇ indicate the specific capacity during discharge for the negative electrode formed with a Si:GO ratio of 1:1. The data points denoted ○ indicate specific capacity during discharge for the negative electrode formed with a Si:GO ratio of 1:2. The data points denoted □ indicate the specific capacity during charge for the negative electrode formed with a Si:GO ratio of 1:2.

It is to be understood that the ranges provided herein include the stated range and any value or sub-range within the stated range. For example, a range from about 5 volts to about 100 volts should be interpreted to include not only the explicitly recited limits of about 5 volts to about 100 volts, but also to include individual values, such as 7.5 volts, 90 volts, etc., and sub-ranges, such as from about 65 volts to about 85 volts, etc. Furthermore, when "about" is utilized to describe a value, this is meant to encompass minor variations (up to ±10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise While several examples have been described in detail, it is to be understood that the disclosed examples may be modified. Therefore, the foregoing description is to be considered non-limiting.

The invention claimed is:

1. A method for manufacturing an electrode for a lithium-based battery by electrophoretic deposition, the method comprising:
   mixing particles with graphene oxide and a binder in a solution, the particles including a material selected from the group consisting of silicon, silicon oxide, silicon alloys, tin, tin oxide, sulfur, lithium manganese oxide, lithium cobalt oxide, lithium nickel oxide, lithium nickel manganese oxide, and lithium nickel manganese cobalt oxide;
   applying a potential between a current collector and a counter electrode immersed in the solution to deposit a coating of a combination of the particles, at least partially reduced graphene oxide, and binder onto the current collector, wherein the particles are wrapped in the at least partially reduced graphene oxide; and
   drying the coated current collector.

2. The method as defined in claim 1 wherein the particles are nanoparticles to micron particles, having a particle size ranging from about 10 nm to about 10 μm.

3. The method as defined in claim 1 wherein the graphene oxide is in the form of 2D nano-sheets with a thickness of about 0.3 nm to about 10 nm and a lateral dimension from about 100 nm to about 50 microns.

4. The method as defined in claim 1 wherein the solution includes an aqueous-based solvent and the binder is soluble in the aqueous-based solvent.

5. The method as defined in claim 4 wherein aqueous-based solvent is water, and wherein the binder is selected from the group consisting of sodium alginate, polyvinyl alcohol (PVA), polyacrylic acid (PAA), carboxymethyl cellulose (CMC), styrene-butadiene rubber (SBR), fluorine acrylic hybrid latex, and mixtures thereof.

6. The method as defined in claim 1 wherein the solution includes a nonaqueous-based solvent and the binder is soluble in the nonaqueous-based solvent.

7. The method as defined in claim 6 wherein nonaqueous-based solvent is selected from the group consisting of N-methyl pyrrolidone (NMP) and toluene and wherein the binder is selected from the group consisting of polyvinylidene fluoride (PVdF), polyethylene oxide (PEO), an ethylene propylene diene monomer (EPDM) rubber, polyacrylic acid (PAA), cross-linked polyacrylic acid-polyethylenimine, polytetrafluoroethylene (PTFE), and polyimide.

8. The method as defined in claim 1 wherein either:
   the particles include the material selected from the group consisting of silicon, silicon alloys, silicon oxide, tin, tin oxide, and the current collector is a material selected from the group consisting of copper, nickel, titanium, stainless steel, graphene paper, graphite paper and carbon nanofiber paper; or
   the particles include the material selected from the group consisting of sulfur, lithium manganese oxide, lithium cobalt oxide, lithium nickel oxide, lithium nickel manganese oxide, and lithium nickel manganese cobalt oxide, and the current collector is a material selected from the group consisting of aluminum and stainless steel.

9. The method as defined in claim 1 wherein the coating has a thickness within a range of about 500 nm to about 100 microns.

10. The method as defined in claim 1 wherein the coated current collector is dried in a vacuum, or an inert atmosphere selected from the group consisting of $N_2$, Ar, and an Ar/$H_2$ mixture, or a reducing environment, at an elevated temperature for a period of time.

11. The method as defined in claim 10 wherein the vacuum is within a range of about 10$^{-5}$ mTorr to about 10 mTorr.

12. The method as defined in claim 10 wherein the elevated temperature is within a range of about 80° C. to about 300° C.

13. The method as defined in claim 10 wherein the period of time is within a range of about 30 minutes to about 10 hours.

14. The method as defined in claim 1 wherein the coating is deposited on the current collector in a continuous roll-to-roll process.

15. The method as defined in claim 14 wherein the current collector is in the form of a continuous ribbon or sheet that is passed from a source roll through the solution using rollers, one of the rollers being grounded with respect to the solution and the counter-electrode being biased negative or positive with respect to the solution, and wherein the method further comprises collecting the coated current collector on a collecting roll.

16. The method as defined in claim 15 wherein the coated current collector is passed through pressure rollers exerting a force of about 5 psi to about 20 psi after emerging from the solution and prior to being collected on the collecting roll in order to control porosity of the coating, wherein the porosity ranges from about 15% to about 60%.

17. A method for manufacturing an electrode for a lithium-based battery by electrophoretic deposition, the method comprising:
  mixing particles with graphene oxide and a binder in a solution, the particles including a material selected from the group consisting of silicon, silicon oxide, silicon alloys, tin, tin oxide, sulfur, lithium manganese oxide, lithium cobalt oxide, lithium nickel oxide, lithium nickel manganese oxide, and lithium nickel manganese cobalt oxide;
  applying a potential within a range of about 5 volts to about 100 volts for a time of about 10 seconds to about 10 minutes between a current collector and a counter electrode immersed in the solution to deposit a coating of a combination of the particles, at least partially reduced graphene oxide, and binder onto the current collector; and
  drying the coated current collector.

18. The method as defined in claim 17 wherein the coating has a thickness within a range of about 500 nm to about 100 microns.

19. The method as defined in claim 17 wherein the coated current collector is dried in a vacuum within a range of about $10^{-5}$ mTorr to about 10 mTorr, or an inert atmosphere selected from the group consisting of $N_2$, Ar, and an $Ar/H_2$ mixture, or a reducing environment, at an elevated temperature within a range of about 80° C. to about 300° C. for a period of time within a range of about 30 minutes to about 10 hours.

* * * * *